Patented Sept. 27, 1949

2,483,199

UNITED STATES PATENT OFFICE 2,483,199

PRODUCTION OF NITROGEN DIOXIDE

John Fessler Haller, Niagara Falls, N. Y., assignor to Mathieson Chemical Corporation No Drawing. Application September 14, 1948, Serial No. 49,293

4 Claims. (Cl. 23—157)

My present invention relates to the generation of nitrogen dioxide and provides an improved process whereby nitrogen dioxide free from other oxides and other nitrogen compounds may be directly produced, either in a substantially pure state or in a state of dilution with a diluent gas, air for instance, by reacting sulfur dioxide gas with aqueous nitric acid.

The generation of nitrogen dioxide by reacting sulfur dioxide with nitric acid has previously been proposed. However, by known processes involving this reaction, the resultant nitrogen dioxide has been contaminated by the presence of other oxides of nitrogen, including NO. For instance, it has been proposed to react sulfur dioxide with aqueous nitric acid of 45-75% concentration at a temperature of 120° C.-450° C., using at least 1.2 mols of $HNO_3$ per mol of $SO_2$, preferably in the presence of a catalyst. It has also been proposed to carry on this reaction at a temperature of 80-90° C., using a dilute nitric acid of 20-25% concentration. To my knowledge, it has not heretofore been possible to produce directly by such reaction nitrogen dioxide uncontaminated by the presence of other oxides of nitrogen.

I have discovered that nitrogen dioxide free from such contaminants may be directly produced by reacting gaseous sulfur dioxide with aqueous nitric acid, providing operating conditions are established and maintained within rather critical limits herein described.

Predicated thereon, the process of my present invention comprises the passing of sulfur dioxide gas, either in the substantially pure state, or in a state of substantial dilution in a diluent gas, air for instance, into a liquid body of aqueous nitric acid of an initial $HNO_3$ concentration of 40-72%, or higher, by weight, at about room temperature, say within the range of 15-35° C. Under these conditions, the sulfur dioxide reacts with the nitric acid liberating nitrogen dioxide substantially uncontaminated by sulfur compounds, or other oxides of nitrogen. The resultant nitrogen dioxide is withdrawn from the zone of reaction and may be used directly or after drying, where substantially dry $NO_2$ is required.

As the process proceeds the concentration of nitric acid gradually drops and a concentration of sulphuric acid gradually builds up in the bath. No water is consumed or formed by the reaction but the proportion of water present is increased slightly as the reaction proceeds due to the introduction of a slightly higher molecular weight gas into the bath and the removal of a lower molecular weight gas from the reaction mixture.

The permissible duration of the reaction appears to depend upon the relative proportions of nitric acid remaining in the bath and the sulphuric acid formed therein. While the limiting proportions are rather critical, the permissible minimum concentration of nitric acid varies somewhat depending upon the initial concentration of the nitric acid in this solution. In general the process should be discontinued when about one-half of the nitric acid initially present has been consumed. At this point the solution will contain slightly less sulphuric acid than nitric acid and the molar ratio of nitric acid initially present to the sulphur dioxide reacted with the solution will be not less than 2:1. It will, of course, be understood that the duration of the reaction may be slightly extended beyond this limit without departing from the spirit of the invention, especially where slight portions of NO are permissible.

For instance, starting with an aqueous nitric acid in which the initial concentration is 40%, i. e., 40% $HNO_3$ and 60% water, by weight, the reaction may be continued until the nitric acid concentration has been reduced to 20%, while when starting with an initial nitric acid concentration of 70% the operation must be discontinued before the nitric acid concentration has been reduced to below 35% if the generation of NO is to be avoided.

Initial nitric acid concentrations in excess of 72%, say up to 98%, may be employed but these more concentrated nitric acids are considerably more expensive and for that reason are usually less desirable. Though the process may be continued until the concentration of nitric acid has been reduced to less than 40%, the initial concentration of nitric acid should not be less than 40%. While I cannot at present fully account for this peculiarity of the process, it may be that the presence of the sulphuric acid formed as the reaction proceeds is responsible for the difference.

By suitable control of the temperatures and concentrations, as heretofore noted, the process may be carried on either as a batch operation or as a continuous operation. For instance, in the latter type of process aqueous nitric acid of the desired concentration may be fed to one end of an elongated reaction chamber and caused to flow through the chamber as a continuous stream, sulphur dioxide is continuously injected into the stream at one or more points along its path in an aggregate amount not exceeding that required to reduce the nitric acid concentration to the permissible lower limit and the resultant sulphuric acid-nitric acid solution continuously discharged from the other end of the chamber, generated nitrogen dioxide being withdrawn from one or more intermediate points or from the exit end of the chamber or both. In either type of operation, it is desirable to provide a vapor space above the body of liquid to permit the disengaging of the nitrogen dioxide from the liquid as generated.

Where substantially pure $NO_2$ is required, I pass substantially pure sulfur dioxide into the nitric acid bath. Where a dilute mixture of $NO_2$ in a diluent gas is desired, I pass a mixture of $SO_2$ and diluent gas into the acid bath. Air has, with advantage, been used for this purpose, but other diluent gases, unobjectionable in the desired product and inert with respect to the reaction by which the $NO_2$ is liberated, for instance carbon dioxide or nitrogen, may be substituted for the air.

The concentration of $SO_2$ in the diluent gas, where used, is subject to considerable variation. For instance, sulfur dioxide diluted with air in proportions of 2 volumes of $SO_2$ to 40 volumes of air, has been used with advantage, the resultant gas comprising 4 volumes of nitrogen dioxide and 40 volumes of air. Even lower concentrations of sulfur dioxide in air may be employed, but the concentration of nitrogen dioxide in the resultant gas mixture will, of course, be appropriately reduced. It will be understood that concentrations within the range from 1% or less, by volume, up to pure sulfur dioxide are within the contemplation of my present invention.

Operating temperatures are also subject to some variation. While it is usually more advantageous to carry on the process at ordinary room temperature, i. e., 20°–25° C. operating temperatures within the range of about 15 to 35° C. may be used.

The process is normally carried on at ordinary atmospheric pressure, but pressures somewhat in excess thereof, sufficient to cause the generated gas to flow to the point of storage or use, may be employed.

As a specific example of the operation of my process, in the production of nitrogen dioxide diluted with air, a mixture of air and sulfur dioxide in proportions 20–1 by volume, was passed into a liquid bath of nitric acid containing 72% $HNO_3$, by weight, at a rate of 42 liters per hour, the temperature of the bath and the entering gas mixture being about 20° C. The effluent gases from the reaction were found to consist of air and nitrogen dioxide in proportions 10 to 1 by volume and to be evolved at the rate of 40 liters of air and 4 liters of nitrogen dioxide per hour. During the process, the concentration of $HNO_3$ in the bath gradually dropped to about 40%, at which time the operation was discontinued.

Under the same conditions just described, except that undiluted sulfur dioxide was passed through the nitric acid bath, substantially pure nitrogen dioxide was directly obtained in substantially quantitative proportions.

The process of my present invention is of particular utility in the generation of nitrogen dioxide for use in the production of chlorine dioxide by the process described and claimed in my copending application Serial No. 15,450, filed March 17, 1948, now Patent No. 2,451,826 of which the present application is in part a continuation.

I claim:

1. In the process for generating nitrogen dioxide by reacting sulfur dioxide with aqueous nitric acid, the step of passing gaseous sulfur dioxide into a liquid body of aqueous nitric acid initially containing not less than 40% $HNO_3$ and at a temperature within the range of 15°–35° C., and discontinuing the reaction when not in excess of one-half of the $HNO_3$ initially present has been consumed, whereby the generated nitrogen dioxide is free from other oxides of nitrogen.

2. In the process for generating nitrogen dioxide by reacting sulfur dioxide with aqueous nitric acid, the step of passing a gaseous mixture of sulfur dioxide and air into a liquid body of aqueous nitric acid initially containing not less than 40% $HNO_3$, and at a temperature within the range of 15°–35° C., and discontinuing the reaction when not in excess of one-half of the $HNO_3$ initially present has been consumed, whereby a mixture of air and nitrogen dioxide free from other oxides of nitrogen is directly obtained.

3. In the process for generating nitrogen dioxide by reacting sulfur dioxide with aqueous nitric acid, the step of passing the gaseous sulfur dioxide in a substantially pure state into a liquid body of aqueous nitric acid initially containing not less than 40% $HNO_3$ and at a temperature within the range of 15°–35° C., and discontinuing the reaction when not in excess of one-half of the $HNO_3$ initially present has been consumed, whereby substantially pure nitrogen dioxide is directly obtained.

4. The process of claim 1 in which the operating temperature is within the range of 20°–25° C.

JOHN FESSLER HALLER.

No references cited.